(12) United States Patent
Chatradhi et al.

(10) Patent No.: US 8,947,813 B2
(45) Date of Patent: Feb. 3, 2015

(54) EMERGENCY POWER OFF (EPO) ISLAND FOR SAVING CRITICAL DATA TO NON-VOLATILE MEMORY

(71) Applicant: HGST Netherlands B.V., Amsterdam (NL)

(72) Inventors: Sridhar Chatradhi, San Jose, CA (US); Rajesh Koul, San Jose, CA (US); Ryan Matthew Schulz, San Jose, CA (US); Anthony Edwin Welter, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/708,901

(22) Filed: Dec. 7, 2012

(65) Prior Publication Data

US 2014/0160595 A1 Jun. 12, 2014

(51) Int. Cl.
*G11B 5/02* (2006.01)

(52) U.S. Cl.
USPC .................................. 360/55; 714/14; 714/24

(58) Field of Classification Search
None
See application file for complete search history.

(56) References Cited

U.S. PATENT DOCUMENTS

| 6,295,577 | B1 | 9/2001 | Anderson et al. |
| 6,725,397 | B1 | 4/2004 | Emberty et al. |
| 2011/0075490 | A1* | 3/2011 | Friendshuh et al. ...... 365/185.33 |
| 2011/0276827 | A1* | 11/2011 | Royer et al. ..................... 714/22 |

* cited by examiner

*Primary Examiner* — Paul Huber
(74) *Attorney, Agent, or Firm* — John D. Henkhaus

(57) ABSTRACT

Approaches for an emergency power off (EPO) power island, for saving critical data to non-volatile memory in the event of an EPO condition, for use in a hard-disk drive (HDD) storage device. The EPO power island includes a controller for detecting an EPO condition. A voltage regulator supplies power from spindle motor back EMF only to the EPO power island and to the non-volatile memory. Thus, the remainder of the hard drive controller (HDC) is isolated from the EPO power island so that it will not corrupt the data as the HDC's power supply is decaying. Using the power provided by the voltage regulator, the EPO power island transfers critical data from a memory internal to the island to a non-volatile memory external to the island, such as to a flash memory chip.

17 Claims, 3 Drawing Sheets

EMERGENCY POWER OFF (EPO) ISLAND FOR SAVING CRITICAL DATA TO NON-VOLATILE MEMORY

FIELD OF THE INVENTION

Embodiments of the invention relate to saving critical data to non-volatile memory in response to an emergency power off event in a hard-disk drive (HDD).

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates. A slider therefore is said to "fly" over the surface of the magnetic-recording disk.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC").

During operation, an HDD may encounter an emergency power off ("EPO") situation, in which the HDD inadvertently loses its power source. During an EPO event, critical data may be lost. For non-limiting examples, user data and/or indirection tables may be lost upon an EPO event, which results in the loss of pointer information which points to the user data on the disk. An indirection table is a collection of pointers that relates the logical data units to physical memory addresses. Thus, loss of the pointer information effectively wipes out the user data because there is no longer a map to where the data actually resides on the disk.

SUMMARY OF EMBODIMENTS OF THE INVENTION

Embodiments of the invention are directed towards an emergency power off (EPO) power island, for saving critical data to non-volatile memory in the event of an EPO condition, for use in a hard-disk drive (HDD) or a hybrid drive storage device.

Embodiments include a hard disk controller (HDC) electronic component which is configured to comprise an EPO power island. The EPO power island includes a controller configured to detect an EPO condition. Further, a voltage regulator is configured to supply power only to the EPO power island portion of the HDC and to a non-volatile memory, in response to detecting the EPO condition. Thus, the remainder of the HDC is isolated from the EPO power island so that it will not corrupt the island or its data as the HDC's power supply is decaying. Using the power provided by the voltage regulator, the EPO power island transfers critical data from a memory internal to the island to a non-volatile memory external to the island, such as to a flash memory chip or other non-volatile memory.

According to an embodiment, the power for supplying to the EPO power island is obtained from back electromotive force (back EMF) from the disk spindle motor as the motor is spinning down due to the power off situation. Use of the EPO power island as described drastically reduces the amount of back EMF needed, thereby only powering the components whose use is needed to transfer the critical data to non-volatile memory rather than using the back EMF to power the full HDC.

Embodiments also comprise locking inputs to the EPO island to known values and temporarily suspending or blocking (e.g., clamping) signal transmissions to the island from other areas of the HDC so that the critical data is not corrupted before it is saved to the non-volatile memory. Effectively, a portion of a typical power-on-reset (POR) process is temporarily suspended while the data transfer process is occurring so that the data is not corrupted by the POR process before there is an opportunity to save it to the non-volatile memory.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to an emergency power off (EPO) power island instantiated for saving critical data to non-volatile memory, for use in a hard-disk drive (HDD), are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Hard Disk Drive Configuration

Figure 1:
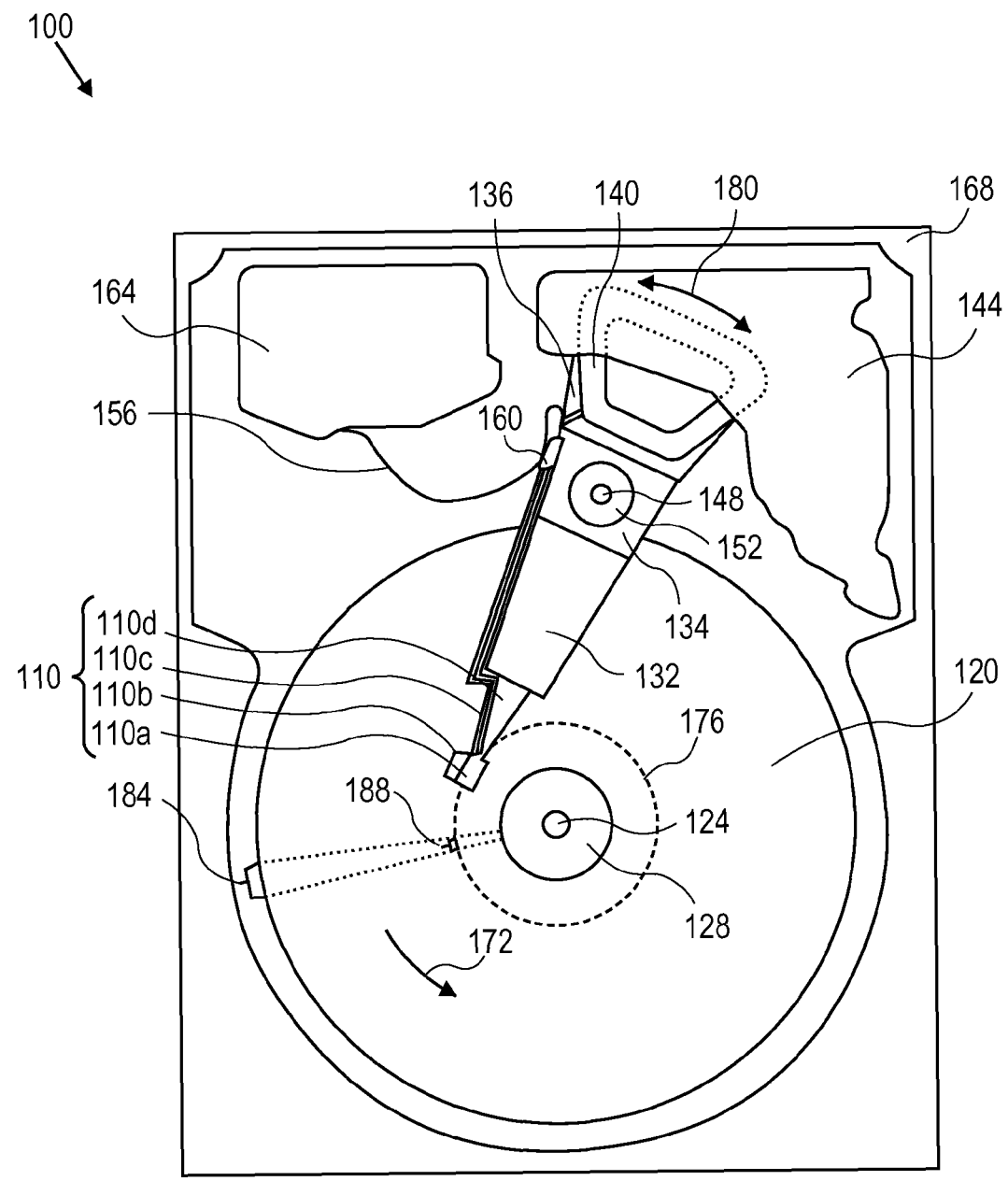
FIG. 1 is a plan view of an HDD, according to an embodiment of the invention.

Embodiments of the invention may be used to manage a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120.

Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

As previously introduced, an HDD may encounter an emergency power off ("EPO") situation in which the HDD inadvertently loses its power source. Further, if EPO events are not handled properly, critical data is likely lost.

Embodiments of the invention are described which isolate an EPO power island of a hard disk controller, for quickly and efficiently storing critical data to non-volatile memory in response to an EPO event. Consequently, user data can again be located after the power source is back up, by reading the contents of the non-volatile memory.

Hard Disk Drive Electronic Components

Figure 2:
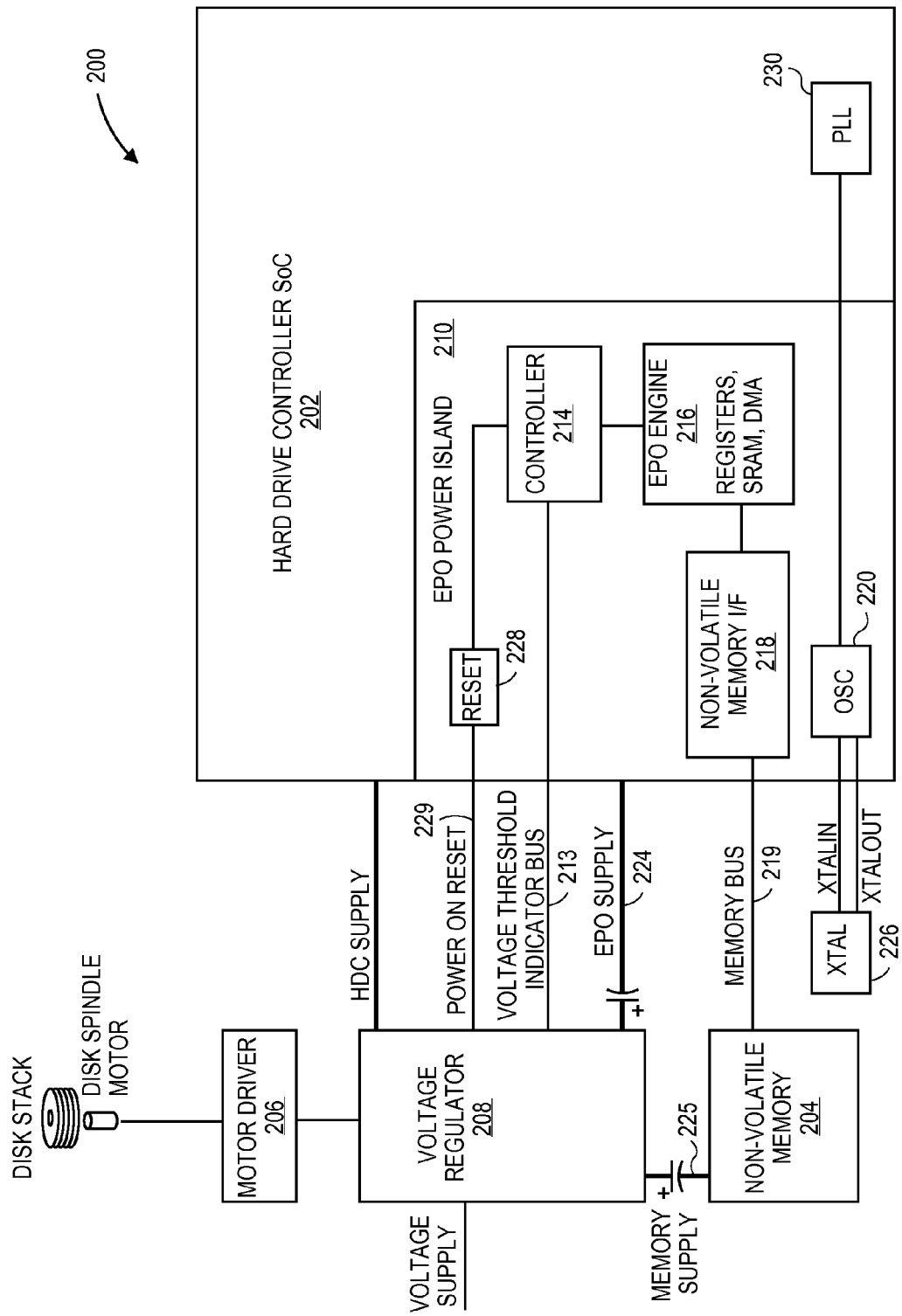
FIG. 2 is a block diagram illustrating an electronic architecture for an HDD for saving critical data to non-volatile memory in response to an EPO event, according to an embodiment of the invention.

FIG. 2 is a block diagram illustrating an electronic architecture for an HDD for saving critical data to non-volatile memory in response to an EPO event, according to an embodiment of the invention. The example electronic architecture 200 illustrated in FIG. 2 includes a hard-disk controller (HDC) 202, non-volatile memory 204, a motor driver 206, and a voltage regulator 208, each of which is described in more detail hereafter.

Hard-disk controllers such as HDC 202 are typically implemented as integrated circuit (IC) boards and, therefore, can be designed in many different architectures of electronic circuitry. Further, modern HDC's often take the form of a system-on-a-chip, or an "SOC". An SOC is an IC that integrates all components of an electronic system into a single chip. An SOC may contain digital, analog, mixed-signal, and other functions, all on a single chip substrate. HDC 202 of FIG. 2 is therefore illustrated as an SOC, although practice of embodiments of the invention described herein are not limited to an HDC SOC architecture.

According to an embodiment, HDC 202 includes an emergency power off (EPO) power island 210 (referred to hereafter for simplicity as "EPO island" 210). As illustrated in the example HDC 202 of FIG. 2, EPO island 210 comprises an EPO island controller 214, an EPO engine 216, and a non-volatile memory interface 218. According to embodiments, EPO island 210 may also comprise an oscillator 220, and may also comprise a reset block 228, each of which is described in more detail herein.

Motor driver 206 is a spindle motor driver for providing driving power for the spindle 124 (FIG. 1) which rotates disk 120 (FIG. 1). Motor driver 206 of example electronic architecture 200 may be implemented in a combo driver, which could also include the functionality required to drive the voice coil 140 (FIG. 1) of the VCM to enable the functionality of the armature 136 (FIG. 1), as a matter of design choice.

EPO island 210 is configured to detect an emergency power off condition, for example, from voltage regulator 208. For example, controller 214 receives one or more signals from the voltage threshold indicator bus 213, which indicates that a emergency power off condition has occurred. Therefore, controller 214 of EPO island 210 is configured for detecting the EPO condition from the voltage regulator 208.

Upon detection of an EPO condition, the EPO island 210 is effectively "isolated" from the rest of the HDC 202. This isolation is implemented at least in part because the rest of the HDC 202 is now losing power and, consequently, it is undesirable for the rest of HDC 202 to corrupt the EPO island 210. Thus, according to an embodiment the voltage regulator 208 supplies core power (e.g., 0.9V) to the digital logic of EPO island 210 during and after an EPO condition, via a transmission line labeled EPO supply 224.

According to an embodiment, EPO island 210 inputs are locked/clamped at known values for transistors affected by other portions of HDC 202 that are now shutting down. The internal logic of EPO island 210, such as values in SRAM of EPO engine 216, are not clamped. For example, since there is a bus that can be used to read from and write to the SRAMs, this input bus is clamped so that nothing external to the EPO island 210 will alter the contents of the SRAMs. However, the contents of the SRAM cells themselves could still be altered even while the isolation/clamp is in effect as long as the internal logic drives such alteration of values. Thus, external stimuli are unable to alter the current behavior or state of the EPO island 210 inputs, yet the internal logic and controls can still alter these values.

According to an embodiment, the power to the voltage regulator 208 is sustained by the motor driver 206 using back EMF of the spinning-down spindle 124 (FIG. 1) motor of the HDD 100 (FIG. 1). As known in the art, back EMF is the voltage, or electromotive force, that pushes against the current which induces it. Back EMF is a voltage that occurs in electric motors where there is relative motion between the armature of the motor and the external magnetic field. Thus, it is this back EMF that is used to power the EPO island 210 during this process of saving critical data to non-volatile memory in response to an EPO condition.

In addition to supplying the power to the EPO island 210 via EPO supply 224, voltage regulator 208 is further responsible for and configured to supply power to the non-volatile memory 204 via a transmission line labeled memory supply 225, during this EPO process. Again, this power supply from voltage regulator 208 to non-volatile memory 204 is enabled by back EMF provided by motor driver 206. As depicted in FIG. 2, dedicated transmission lines, EPO supply 224 and memory supply 225, are provided for supplying power only to the EPO island 210 and the non-volatile memory 204, thereby isolating these components from the rest of HDC 202. Although shown in FIG. 2 as two separate transmission lines (i.e., voltage rails), EPO supply 224 and memory supply 225 may be configured as a single voltage rail, and this is a matter of design choice which may vary from implementation to implementation.

According to an embodiment, the non-volatile memory 204 is implemented as flash memory. According to a related embodiment, the non-volatile memory 204 implemented as flash memory is Serial NOR flash. However, the type of non-volatile memory and, if flash memory, the type of flash, may vary from implementation to implementation. For example, embodiments may be implemented with NAND flash.

EPO island 210 is further configured for transferring data, preferably critical data, from memory internal to the EPO island 210 to the non-volatile memory 204 which is external to the EPO island 210. For example, under the control of controller 214, critical data such as user data and/or metadata, is transferred from SRAM within EPO engine 216 through non-volatile memory interface 218 to non-volatile memory 204 via memory bus 219, thereby saving critical data needed to effectively recover from the EPO condition upon a power-on reset (POR) process. According to an embodiment, to facilitate a speedy transfer of data from the EPO engine 216 to the non-volatile memory 204 so that the transfer is completed before all the back EMF power is depleted, the data transfer process is initiated to pre-erased non-volatile memory 204. Thus, the limited available power is not unnecessarily used to erase the non-volatile memory during this critical data saving process.

According to an embodiment, EPO island 210 is further configured with an oscillator 220. Oscillator 220 is configured to operate as a reference clock for the EPO island 210. For example, oscillator 220 may be implemented to be driven by crystal 226 (labeled as "XTAL"). Oscillator 220 is configured to operate at a clock frequency that is lower than the frequency at which the system clock of the HDC 202 operates, e.g., from the PLL 230 in HDC 202. Consequently, PLL 230 can be placed outside the EPO island 210 to save power that would otherwise be needed by EPO island 210 to drive the higher clock frequency and the functionality of PLL 230, thereby using less power than normal during this critical data saving process.

Method for Instantiating a Power Island

Figure 3:
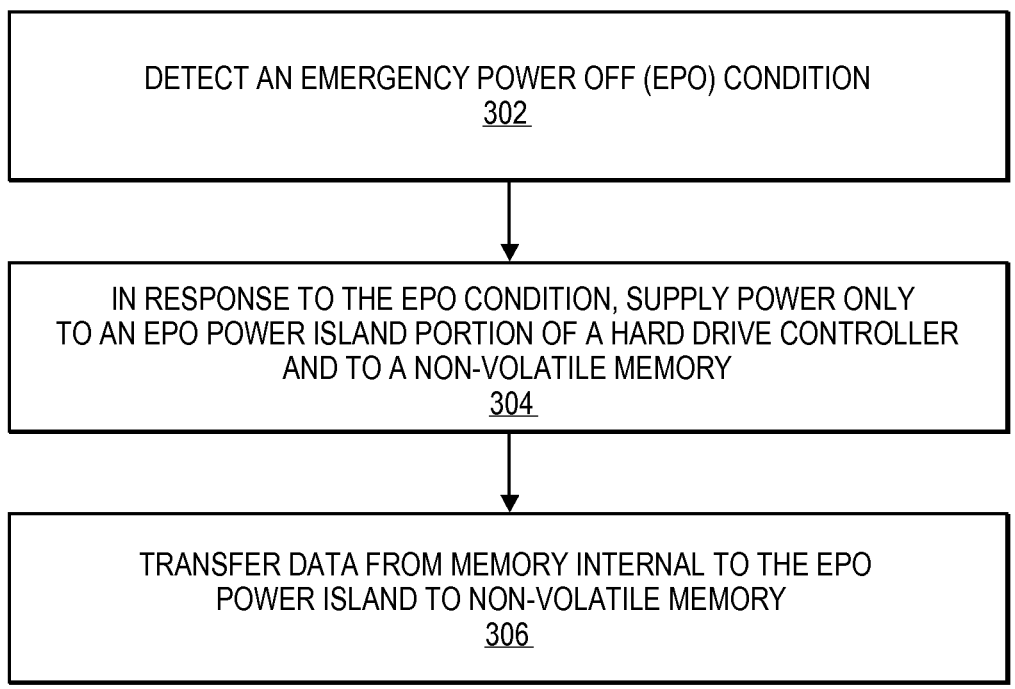
FIG. 3 is a flow diagram illustrating a method for instantiating a power island to save critical data in an EPO situation, according to an embodiment of the invention.

FIG. 3 is a flow diagram illustrating a method for instantiating a power island to save critical data in an EPO situation, according to an embodiment of the invention. The process depicted in FIG. 3 may be implemented in a hard disk controller such as HDC 202 (FIG. 2), according to an embodiment. The process logic may be implemented as analog or digital hardware circuitry within the HDC or as firmware instructions executed by a processor, such as a CPU or MPU, within the HDC. However, implementation of the logic corresponding to the method for instantiating a power island is no limited to implementation within a hard disk controller. Rather, the logic may be implemented in other electronic components constituent to a hard disk drive storage device.

"Critical data" generally refers to data or information that is critical to maintaining the state of user data stored on disk, or is in the process of being written to disk. Examples of critical data include user data and metadata (e.g., pointer information which points to the user data on the disk).

At 302, an EPO condition is detected. For example, the EPO power island controller 214 receives one or more signals from voltage regulator 208 over voltage threshold indicator bus 213, which indicates that an EPO event or condition has occurred. It is worth noting again that motor driver 206 and voltage regulator 208 may be implemented in a combo driver configuration, so the functionality and operation of each respective block, motor driver 206 and voltage regulator 208, may be functionality and operations of a combo driver component.

At 304, in response to detecting the EPO condition, power is supplied only to the power island portion of the HDC 202 (FIG. 2) and to the non-volatile memory 204. For example, voltage regulator 208 supplies power to the digital logic of EPO island 210 (e.g., via EPO supply 224) and to non-volatile memory 204 (e.g., via memory supply 225) during and after an EPO condition. The input to the voltage regulator 208 is sustained by the motor driver 206 which, according to an embodiment, acquires its power during an EPO condition from back EMF from spindle 124 (FIG. 1).

As described, the state of the critical data is locked down and immune from corruption while the data saving process is executing, by clamping all inputs into the EPO island 210 that originate from any other power island within the HDC 202, all of which are losing power during the data transfer from internal memory to external non-volatile memory. Therefore, any signals originating from or powered by HDC SUPPLY (i.e., part of the HDC 202 but not a part of the EPO island 210) that are then sent into the EPO island 210 (powered by EPO supply 224) will be clamped so that no signal from a corrupted domain can influence the behavior of the protected domain, i.e., the EPO island 210. Further, according to an embodiment the controller 214 of EPO island 210 temporarily suspends a portion of a power-on-reset (POR) process that would normally be initiated at this time in response to a emergency power off event. The EPO island 210 portion of the POR process is the portion that is temporarily suspended.

At 306, data is transferred from memory internal to the EPO island to non-volatile memory. For example, the locked critical data is transferred from memory internal to the EPO island 210 to be saved in the non-volatile memory 204. For example, under the control of controller 214 of EPO island 210, critical data such as user data and metadata are transferred from SRAM within EPO engine 216 through non-volatile memory interface 218 to non-volatile memory 204 via memory bus 219, thereby saving critical data needed to effectively recover from the EPO condition upon a power-on reset (POR) process. Further, according to the embodiment in which the POR process is suspended, once the transfer of data from EPO engine 216 to non-volatile memory 204 is completed, then the EPO island 210 portion of the POR process is allowed to continue in a typical manner. The POR reset process is enabled by reset block 228 of EPO island 210, via power on reset line 229, according to an embodiment.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
a magnetic-recording disk rotatably mounted on a spindle;
a head slider, housing a read/write head for writing data to and reading data from the magnetic-recording disk;
a voice coil motor configured to move the head slider to access portions of the magnetic-recording disk;
a hard drive controller electronic component;
a motor driver configured for supplying power to a spindle motor;
a voltage regulator configured for supplying power to said hard drive controller;
non-volatile memory for storage of data;
wherein said hard drive controller comprises an emergency power off (EPO) power island comprising:
an EPO power island controller configured for detecting an EPO condition,
a non-volatile memory interface configured for transferring data from memory internal to said EPO island to said non-volatile memory, and
an oscillator configured for operating as a reference clock for said EPO power island, wherein said oscillator operates at a lower frequency than a frequency at which a system clock of said hard drive controller operates; and
wherein said voltage regulator is configured for supplying power from said motor driver only to said EPO power island portion of said hard drive controller and to said non-volatile memory, to isolate said EPO power island portion and said non-volatile memory in response to said EPO condition.

2. The hard-disk drive of claim 1, said motor driver further configured for using back electromotive force from said spindle motor to supply power to said voltage regulator in response to said EPO condition.

3. The hard-disk drive of claim 1, said EPO power island controller further configured for:
temporarily suspending signal transmissions, which would change said data, to said EPO island.

4. The hard-disk drive of claim 1, wherein said non-volatile memory is flash memory.

5. The hard-disk drive of claim 4, wherein said flash memory to which said data is transferred is pre-erased flash memory.

6. The hard-disk drive of claim 1, said EPO power island controller further configured for:
in response to said EPO condition, temporarily suspending a portion of a power-on-reset process associated with said EPO power island, and
upon completing transferring said data to said non-volatile memory, allowing said portion of said power-on-reset process to continue.

7. The hard-disk drive of claim 1, wherein said data transferred to said non-volatile memory is at least one from the group consisting of user data and metadata.

8. The hard-disk drive of claim 1, wherein said data transferred to said non-volatile memory is data representing at least a portion of an indirection table.

9. A method for instantiating a power island to save critical data in an emergency power off (EPO) situation in a hard disk drive (HDD) device, the method comprising:
detecting an EPO condition affecting said HDD device;
supplying power only to said power island of a hard drive controller and not to the rest of said hard drive controller;
operating a reference clock for said power island, wherein said reference clock operates at a lower frequency than a frequency at which a system clock of said hard drive controller operates; and
transferring data from volatile memory internal to said power island to non-volatile memory external to said power island.

10. The method of claim 9, further comprising:
supplying power to said non-volatile memory.

11. The method of claim 9, wherein supplying power to said power island portion comprises:
supplying power from a motor driver configured for using back electromotive force from a spindle motor of said HDD device.

12. The method of claim 9, further comprising:
   temporarily suspending signal transmissions, which would change said data, to said power island.

13. The method of claim 9, wherein transferring data to said non-volatile memory comprises:
   transferring data to pre-erased flash memory.

14. The method of claim 9, wherein transferring data to said non-volatile memory comprises:
   transferring at least one of user data and metadata to flash memory.

15. The method of claim 9, wherein transferring data to said non-volatile memory comprises:
   transferring at least a portion of one or more indirection tables to flash memory.

16. The method of claim 9, further comprising:
   in response to detecting said EPO condition, temporarily suspending a power island portion of a power-on-reset process associated with said power island, and
   upon completing transferring said data to said non-volatile memory, allowing said portion of said power-on-reset process to continue.

17. A hard-drive controller electronic component comprising an emergency power off (EPO) power island, said EPO power island comprising:
   an EPO power island controller configured for detecting an EPO condition;
   a non-volatile memory interface configured for transferring data from memory internal to said EPO island to non-volatile memory external to said hard-drive controller;
   an oscillator configured for operating as a reference clock for said EPO power island, wherein said oscillator operates at a lower frequency than a frequency at which a system clock of said hard-drive controller operates;
   wherein only said EPO power island of said hard-drive controller and said non-volatile memory receive power from a voltage regulator in order to isolate said EPO power island and said non-volatile memory in response to said EPO condition; and
   wherein said power supplied from said voltage regulator is from a motor driver configured for using back electromotive force from a spindle motor of said hard-drive.

\* \* \* \* \*